D. R. SCHOLES.
LUBRICATING MECHANISM.
APPLICATION FILED APR. 9, 1914.
1,101,211.
Patented June 23, 1914.
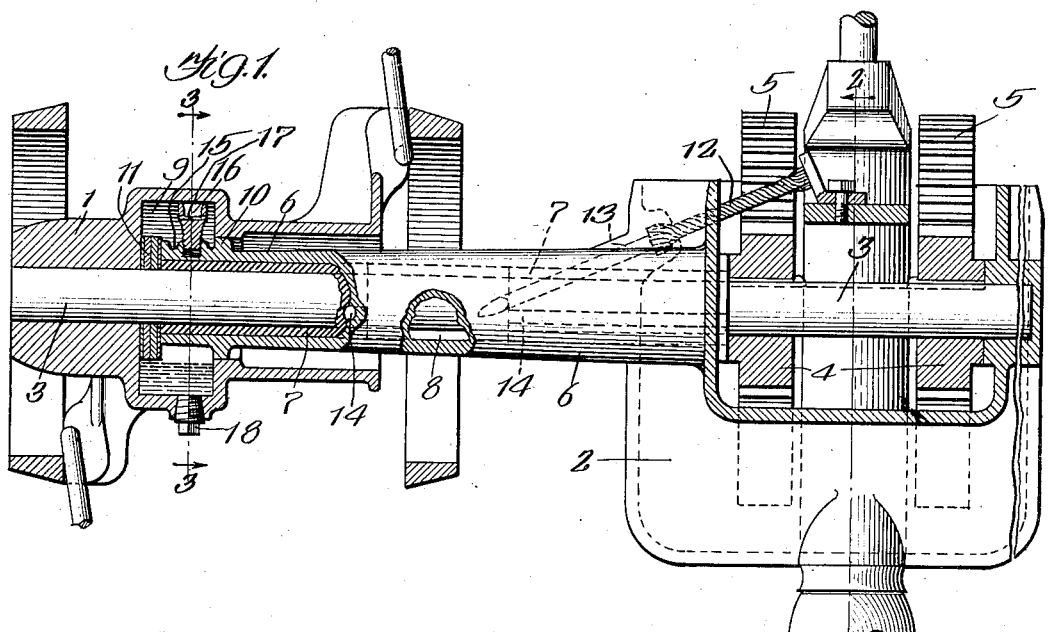
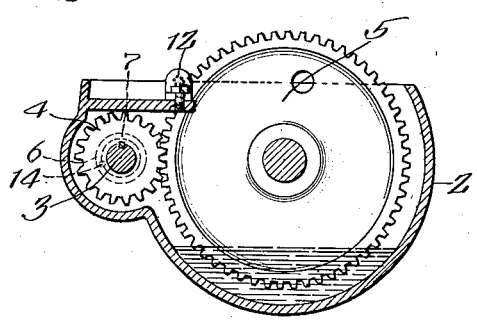
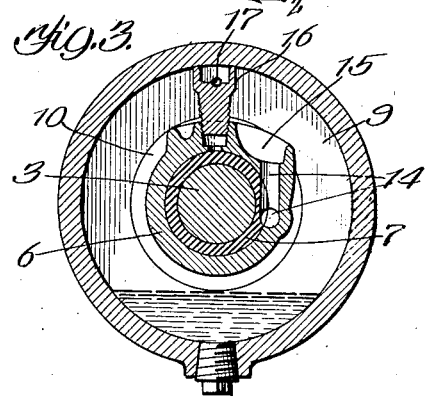
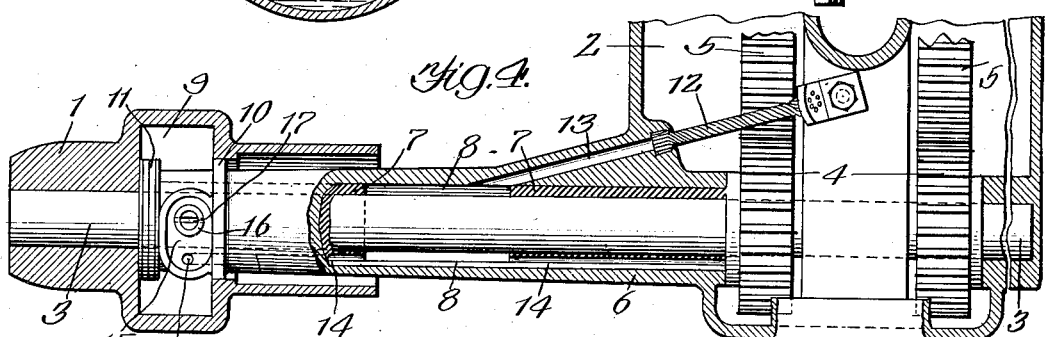
Witnesses:
Jno. H. Nelson Jr.
Edwin B. Nelson
Inventor:
Daniel R. Scholes
By G. L. Cragg, Atty.

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

LUBRICATING MECHANISM.

1,101,211.  Specification of Letters Patent.  Patented June 23, 1914.

Application filed April 9, 1914. Serial No. 830,579.

*To all whom it may concern:*

Be it known that I, DANIEL R. SCHOLES, citizen of the United States, residing at Chicago, in the county of Cook and State of Illinois, have invented a certain new and useful Improvement in Lubricating Mechanism, of which the following is a full, clear, concise, and exact description, reference being had to the accompanying drawings, forming a part of this specification.

The invention relates to lubricating mechanism and has for its object the provision of improved means for lubricating shafts and bearings and freely removing the lubricant after it has performed its work.

In the preferred embodiment of the invention means are afforded for effecting the continuous circulation of lubricating oil from a receptacle through the bearings to be lubricated thence back to the receptacle, an oil containing chamber receiving the oil after it has performed its lubricating function and from which chamber the oil is returned to said receptacle, this chamber preferably encircling the shaft which is coupled therewith so as to rotate in an upright plane to enable the oil to be lifted from the bottom of the chamber in order that it may descend into a suitable free passage leading to said receptacle.

The invention will be explained more fully by reference to the accompanying drawing showing the manner in which it is preferably embodied in a wind mill structure and in which—

Figure 1 is a longitudinal sectional elevation; Fig. 2 is a vertical sectional view on line 2—2 of Fig. 1; Fig. 3 is a view on line 3—3 of Fig. 1; and Fig. 4 is a plan view, partially in section, of a part of the mechanism.

Like parts are indicated by similar characters of reference throughout the different figures.

The horizontal hub 1 of the upright wind wheel of the wind mill extends toward the lubricant oil containing gear case or receptacle 2. The shaft 3 of the wind wheel is in fixed relation to said hub and fixedly carries two upright pinions or gears 4 4 that are in mesh with two upright gears 5 5 in driving connection with the load element that the mill is to operate. The wind wheel shaft and the gears 4, 5 have suitable bearings in the gear case 2 which constitutes an enlargement of or is carried by the wind wheel supporting mill head that is suitably mounted to turn about an upright axis. The elongated shaft bearing 6 is desirably integrally cast with the gear case and preferably has a lining 7 of Babbitt metal or other antifriction material for the shaft to turn within. An intermediate portion of the lining 7 is removed to form an annular lubricant oil receptacle 8 about an intermediate portion of the shaft 3 and within the bearing 6. The hub bore is closed at its left hand or outer end by the shaft 3 upon which the hub is rigidly secured, but is enlarged adjacent this end to form an annular lubricant oil containing chamber 9 that has an upright plane of rotation because of its fixed or coupled connection with the horizontal shaft. The chamber is confined, in extent, to the left hand or outer end of the bearing 6 that has a flange 10 to separate the space of chamber 9 from the balance of the hub bore portion which surrounds said bearing. While the chamber 9 happens to be formed in the hub of a wind wheel the invention is not to be limited to such a location of the chamber. A portion of the bearing projects well into the space of the chamber 9, an end thrust take up device or bearing 11 intervening between the outer end of the hub and the contiguous end of the bearing.

An inclined oil leader or wick 12, that is desirably composed of spirally wound wire strands, serves to receive oil carried up by the teeth of one of the gears 5 (with which teeth the wick or lubricant conveyer preferably contacts or almost contacts) from the lower portion of the gear case 2 and to transfer the same to an inclined passage or channel 13 passing through the bearing 6 into communication with the receptacle 8. The oil works in both directions from receptacle 8 between the shaft 3 and the lining portions 7 surrounding the same, to lubricate the shaft and its bearing, oil that works to the left passing by element 11 and into the chamber 9, while oil that works to the right is returned to the gear case from whence it may again be passed to said receptacle 8 in the manner hitherto described.

Oil that is caught in the chamber 9 is returned to the gear case for repeated use by means whose preferred form will be described. A free oil passage 14, of which the receptacle 8 may be said to constitute a reservoir like enlargement, is formed by matched grooves in the bearing 6 and its lining 7, and serves to pass or return oil from the chamber 9 first to the receptacle 8 and then to the gear case 2 from which case it is taken for repeated use. The passage 14 terminates at the left of the structure in a well 15 formed in an upper portion of the bearing that underlies the upper part of the cylindrical or transverse wall portion of the rotating chamber 9, this chamber wall portion operating to elevate a film of oil a part of which descends into the well from which it flows into the sections of passage 14 that return it freely to the gear case. The invention is not to be limited, however, to the transfer of oil to the passage 14 from the transverse part of the wall of chamber 9. In order to promote the descent of oil from the upper part of the chamber 9 to the passage 14, a leader 16 is employed which is screwed into the bearing 6 and is surrounded by the border of the well 15. The upper end of this leader may be in the form of a tube whose upper edge conforms to the shape of the cylindrical wall of chamber 9 and is nearly or quite in contact with this wall. The tubular portion of leader 16 has a slot 17 through which oil that enters said tubular portion may find passage to the well and thence ultimately to the gear case. A plug 18 affords access to the chamber 9.

By means of the structure described, the oil may be copiously supplied from the gear case to the bearings to be lubricated and is freely returned so that it will not remain in accumulation outside of the gear case. The bottoms of gears 5 are well below the adjacent end of the oil passage 14, as is the bottom of the gear case of course, whereby said gear case may contain an ample supply of lubricant.

While I have herein shown and particularly described the preferred embodiment of my invention I do not wish to be limited to the precise details of construction shown as changes may readily be made without departing from the spirit of my invention.

Having thus described my invention I claim as new and desire to secure by Letters Patent the following:—

1. Lubricating mechanism including a lubricant receiving chamber having an upright plane of rotation; a shaft rotating with said chamber; a bearing for said shaft, said shaft and bearing having portions within said chamber; gearing in connection with said shaft; a lubricant containing gear case for said gearing; a lubricant conveyer positioned between said gearing and the bearing to transfer lubricant elevated by the gearing to engaged surfaces of the shaft and bearing, there being a comparatively free lubricant returning passage communicating with said gear case and having its receiving end in position to receive lubricant descending from an elevated transverse wall portion of said chamber; and a leader carried within the chamber by the bearing in close proximity to said chamber wall portion for taking lubricant therefrom and promoting its flow to said passage.

2. Lubricating mechanism including a lubricant receiving chamber having an upright plane of rotation; a shaft rotating with said chamber; a bearing for said shaft, said shaft and bearing having portions within said chamber; gearing in connection with said shaft; a lubricant containing gear case for said gearing; and a lubricant conveyer positioned between said gearing and the bearing to transfer lubricant elevated by the gearing to engaged surfaces of the shaft and bearing, there being a comparatively free lubricant returning passage communicating with said gear case and having its receiving end in position to receive lubricant descending from an elevated transverse wall portion of said chamber.

3. Lubricating mechanism including a lubricant receiving chamber having an upright plane of rotation; a shaft rotating with said chamber; a bearing for said shaft, said shaft and bearing having portions within said chamber; gearing in connection with said shaft; a lubricant containing gear case for said gearing; and a lubricant conveyer positioned between said gearing and the bearing to transfer lubricant elevated by the gearing to engaged surfaces of the shaft and bearing, there being a comparatively free lubricant returning passage communicating with said gear case and having its receiving end in position to receive lubricant descending from an elevated wall portion of said chamber.

4. Lubricating mechanism including a lubricant receiving chamber having an upright plane of rotation; a rotating shaft; a bearing for said shaft; gearing in connection with said shaft; a lubricant containing gear case for said gearing; a lubricant conveyer positioned between said gearing and the bearing to transfer lubricant elevated by the gearing to engaged surfaces of the shaft and bearing, there being a comparatively free lubricant returning passage communicating with said gear case and having its receiving end in position to receive lubricant descending from an elevated transverse wall portion of said chamber; and a leader in close proximity to said chamber wall portion for taking lubricant therefrom and promoting its flow to said passage.

5. Lubricating mechanism including a lubricant receiving chamber having an upright plane of rotation; a rotating shaft; a bearing for said shaft; gearing in connection with said shaft; a lubricant containing gear case for said gearing; and a lubricant conveyer positioned between said gearing and the bearing to transfer lubricant elevated by the gearing to engaged surfaces of the shaft and bearing, there being a comparatively free lubricant returning passage communicating with said gear case and having its receiving end in position to receive lubricant descending from an elevated transverse wall portion of said chamber.

6. Lubricating mechanism including a lubricant receiving chamber having an upright plane of rotation; a rotating shaft; a bearing for said shaft; gearing in connection with said shaft; a lubricant containing gear case for said gearing; and a lubricant conveyer positioned between said gearing and the bearing to a transfer lubricant elevated by the gearing to engaged surfaces of the shaft and bearing, there being a comparatively free lubricant returning passage communicating with said gear case and having its receiving end in position to receive lubricant descending from an elevated wall portion of said chamber.

7. Lubricating mechanism including a lubricant receiving chamber having an upright plane of rotation; a shaft rotating with said chamber; a bearing for said shaft, said shaft and bearing having portions within said chamber; a lubricant receptacle in communication with said bearing for supplying lubricant to engaging surfaces of said bearing and shaft, there being a comparatively free lubricant returning passage communicating with said receptacle and having its receiving end in position to receive lubricant descending from an elevated transverse wall portion of said chamber; and a leader carried within the chamber by the bearing in close proximity to said chamber wall portion for taking lubricant therefrom and promoting its flow to said passage.

8. Lubricating mechanism including a lubricant receiving chamber having an upright plane of rotation; a shaft rotating with said chamber; a bearing for said shaft, said shaft and bearing having portions within said chamber; and a lubricant receptacle in communication with said bearing for supplying lubricant to engaging surfaces of said bearing and shaft, there being a comparatively free lubricant returning passage communicating with said receptacle and having its receiving end in position to receive lubricant descending from an elevated transverse wall portion of said chamber.

9. Lubricating mechanism including a lubricant receiving chamber having an upright plane of rotation; a shaft rotating with said chamber; a bearing for said shaft, said shaft and bearing having portions within said chamber; and a lubricant receptacle in communication with said bearing for supplying lubricant to engaging surfaces of said bearing and shaft, there being a comparatively free lubricant returning passage communicating with said receptacle and having its receiving end in position to receive lubricant descending from an elevated wall portion of said chamber.

10. Lubricating mechanism including a lubricant receiving chamber having an upright plane of rotation; a rotating shaft; a bearing for said shaft; a lubricant receptacle in communication with said bearing for supplying lubricant to engaging surfaces of said bearing and shaft, there being a comparatively free lubricant returning passage communicating with said receptacle and having its receiving end in position to receive lubricant descending from an elevated transverse wall portion of said chamber; and a leader in close proximity to said chamber wall portion for taking lubricant therefrom and promoting its flow to said passage.

11. Lubricating mechanism including a lubricant receiving chamber having an upright plane of rotation; a rotating shaft; a bearing for said shaft; and a lubricant receptacle in communication with said bearing for supplying lubricant to engaging surfaces of said bearing and shaft, there being a comparatively free lubricant returning passage communicating with said receptacle and having its receiving end in position to receive lubricant descending from an elevated transverse wall portion of said chamber.

12. Lubricating mechanism including a lubricant receiving chamber having an upright plane of rotation; a rotating shaft; a bearing for said shaft; and a lubricant receptacle in communication with said bearing for supplying lubricant to engaging surfaces of said bearing and shaft, there being a comparatively free lubricant returning passage communicating with said receptacle and having its receiving end in position to receive lubricant descending from an elevated wall portion of said chamber.

In witness whereof, I hereunto subscribe my name this 26th day of March A. D., 1914.

DANIEL R. SCHOLES.

Witnesses:
JAMES P. CONDON,
LEE P. MILLARD.